(12) United States Patent
Song et al.

(10) Patent No.: US 9,014,003 B2
(45) Date of Patent: Apr. 21, 2015

(54) DECOUPLED AND CONCURRENT PACKET PROCESSING AND PACKET BUFFERING FOR LOAD-BALANCING ROUTER ARCHITECTURE

(75) Inventors: Haoyu Song, Cupertino, CA (US); Thomas J. Boures, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 246 days.

(21) Appl. No.: 13/291,195

(22) Filed: Nov. 8, 2011

(65) Prior Publication Data

US 2013/0114413 A1    May 9, 2013

(51) Int. Cl.
*H04L 12/861* (2013.01)
*H04L 12/24* (2006.01)
*H04L 12/54* (2013.01)
*H04L 12/801* (2013.01)

(52) U.S. Cl.
CPC ........... *H04L 49/9042* (2013.01); *H04L 12/569* (2013.01); *H04L 41/0896* (2013.01)

(58) Field of Classification Search
CPC . H04L 29/06; H04L 29/0653; H04L 29/0604; H04L 29/06095; H04L 29/08027; H04L 45/00; H04L 47/10; H04L 47/22; H04L 47/2441; H04L 12/5602; H04L 12/5693; H04L 5/22; H04L 5/24; H04L 25/14; H04L 49/351; H04L 49/3009; H04L 2012/5652; H04L 12/569; H04L 41/0896; H04L 47/18; H04L 49/9042; H04J 3/1647; H04J 3/1611; H04J 2203/0089
USPC .................... 370/235, 237, 392, 395.32, 409; 709/223, 226, 242, 245, 249
See application file for complete search history.

(56) References Cited

U.S. PATENT DOCUMENTS

| | | | |
|---|---|---|---|
| 6,453,360 B1 * | 9/2002 | Muller et al. ................. | 709/250 |
| 6,654,373 B1 * | 11/2003 | Maher et al. .................. | 370/392 |
| 2005/0232303 A1 * | 10/2005 | Deforche et al. ............. | 370/469 |
| 2008/0247355 A1 | 10/2008 | Ahn | |
| 2009/0031101 A1 * | 1/2009 | Soga et al. .................... | 711/200 |
| 2009/0055580 A1 * | 2/2009 | Moscibroda et al. ......... | 711/104 |
| 2010/0284271 A1 * | 11/2010 | Ferguson et al. ............. | 370/230 |
| 2011/0268119 A1 * | 11/2011 | Pong et al. .................... | 370/392 |

FOREIGN PATENT DOCUMENTS

| | | |
|---|---|---|
| CN | 101217452 A | 7/2008 |
| CN | 101552931 A | 10/2009 |
| WO | WO 0223823 A1 * | 3/2002 |

OTHER PUBLICATIONS

Foreign Communication From a Counterpart Application, PCT Application PCT/CN2012/084278, International Search Report dated Feb. 28, 2013, 6 pages.
Foreign Communication From a Counterpart Application, PCT Application PCT/CN2012/084278, Written Opinion dated Feb. 28, 2013, 4 pages.

* cited by examiner

*Primary Examiner* — Alpus H Hsu
*Assistant Examiner* — Dharmesh Patel
(74) *Attorney, Agent, or Firm* — Conley Rose, P.C.; Grant Rodolph; William H. Dietrich

(57) ABSTRACT

A network component comprising a traffic manager (TM) configured to assign a unique identifier (ID) to a received packet, a splitter module configured to separate a header and a payload of the received packet, the splitter module further configured to attach the unique ID to each of the header and the payload, and a merger module configured to assemble an outgoing packet using the header and the payload.

17 Claims, 4 Drawing Sheets

DECOUPLED AND CONCURRENT PACKET PROCESSING AND PACKET BUFFERING FOR LOAD-BALANCING ROUTER ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current Internet Protocol (IP) networks comprise a plurality of nodes, including a plurality of routers at the core of the network and a plurality of hosts at the edge of the network. The routers collectively link the communication channels between hosts. The nodes are assigned network-wide unique IP addresses to enable proper and efficient traffic forwarding to destination nodes. The routers route packets in the IP networks based on the IP addresses carried in the packets. The packets are forwarded by the routers to proper destinations based on a <source address, destination address> pair, which may be indicated in each packet. The routers may have a plurality of ports. The ports may be used to send and/or receive packets to and/or from the IP network. Certain routers may be configured to load-balance. Load-balancing includes distributing packets received at an input port across several output ports, in attempt to balance the number of packets output from each port. Load-balancing may prevent congestion on certain paths through the network by distributing packets to other less used paths.

SUMMARY

In one embodiment, the disclosure includes a network component comprising a traffic manager (TM) configured to assign a unique identifier (ID) to a received packet, a splitter module configured to separate a header and a payload of the received packet, the splitter module further configured to attach the unique ID to each of the header and the payload, and a merger module configured to assemble an outgoing packet using the header and the payload.

In another embodiment, the disclosure includes a method for load-balancing comprising the steps of receiving a packet; assigning a unique identifier (ID) to the packet; splitting the packet into a header and a payload for separate processing of the header and the payload; attaching the unique ID to each of the header and the payload; and subsequently reassembling the packet using the unique ID.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
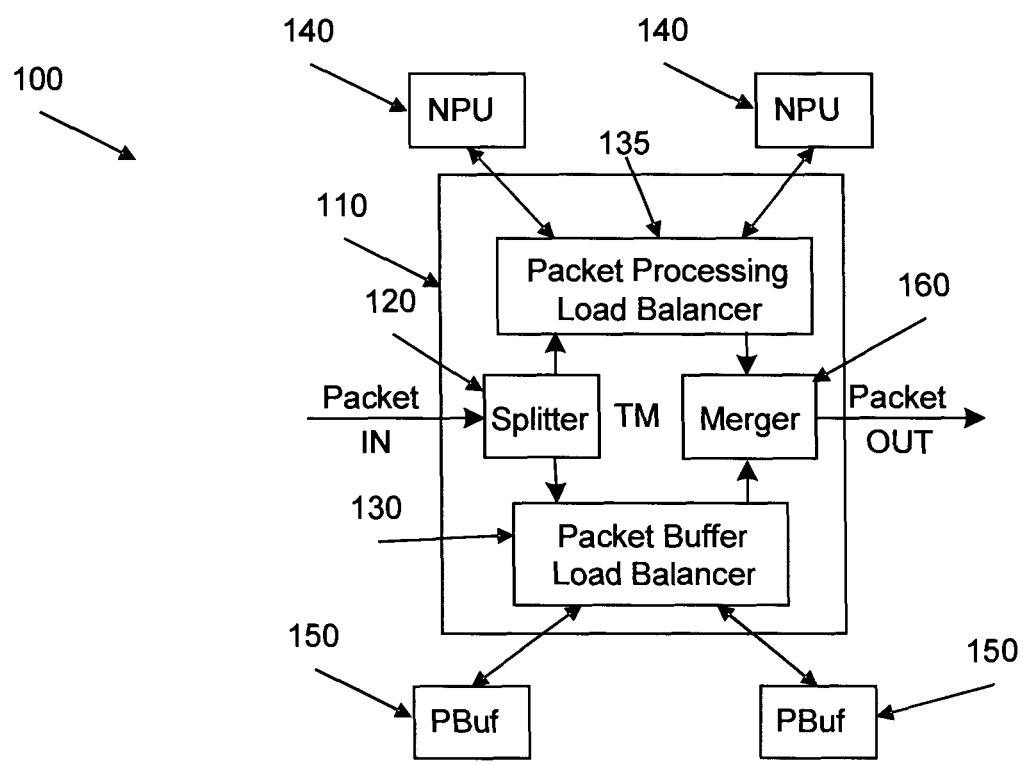
FIG. 1 is a schematic diagram of an embodiment of a decoupled and concurrent packet processing and packet buffering architecture.

It should be understood at the outset that although an illustrative implementation of one or more embodiments are provided below, the disclosed systems and/or methods may be implemented using any number of techniques, whether currently unknown or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As technology and networks evolve, the amount of data transported through networks continues to increase. Transported data may be referred to herein as packets, network traffic, or simply, traffic. Traffic may be routed through a network using a router or some other traffic management device. While the implementations described herein may reference a router, it should be understood that any traffic directing device may be used to implement the embodiments described herein. Routers may be configured to distribute received traffic as evenly as possible across several output ports. Traffic across several output ports may not be exactly equal, but may be substantially equal over time or instantaneously at the output ports. Routers currently in use may implement load-balancing on a line card. The line card may be a replaceable component of the router. At present, line cards may implement load balancing in two ways. A first example is: processing the packet by a network processor unit (NPU), and subsequently buffering the packet by a traffic manager (TM). A second example is: buffering the packet and subsequently processing the packet by an NPU. Both methods currently in use require serial processing of the packets. In these serial processing techniques, the total packet processing latency may be described as the sum of: NPU latency (Tn) plus buffer latency (Tb) plus TM latency (Ts). i.e. total latency in traditional systems=Tn+Tb+Ts.

In addition to the delays associated with serial processing, the NPU and buffer may share a load balancer. This may be a disadvantage because the NPU may be sensitive to packet rate, while the buffer may be sensitive to bit rate. In addition, different types of packets may require different services which may lead to very different processing times based upon the type of packet. For example, in an attempt to balance bit rate, a large number of small packets may be sent on one path while several large packets may be sent on a second path. This may not seem balanced from an NPU's point of view, however, from the buffer standpoint, the traffic may be well load balanced.

Disclosed herein is a system and method for decoupled and concurrent packet processing and packet buffering for load balancing router architecture. The system decouples the processing path between an NPU and packet buffer. Load balancing for the NPU and packet buffer is accomplished separately, e.g. in parallel. Lower overall processing latency may be achieved with the decoupling because NPU and packet buffer processing may be accomplished simultaneously, i.e. total latency=max{Tn,Tb}+Ts. In addition, the architecture may be optimized by independently selecting the number of NPUs and packet buffers based upon system performance requirements and component capabilities.

FIG. 1 illustrates an embodiment of a decoupled and concurrent packet processing and packet buffering architecture 100. The decoupled and concurrent packet processing and packet buffering architecture 100 may be implemented on a router line card or on any other device capable of routing or forwarding data traffic. The decoupled and concurrent packet processing and packet buffering architecture 100 comprises a traffic manager (TM) 110, one or more network processor units (NPU) 140, and one or more packet buffers 150. The TN 110 comprises a splitter module 120, a merger module 160, a packet buffer load balancer 130, and a packet processing load balancer 135.

When a packet arrives at the TM 110 it is assigned a unique identifier (ID). The unique ID may be the compound of a flow ID plus a sequence number or simply a sequence number. A sequential unique ID may be used to enforce packet ordering within the system. By transmitting the sequence numbers in order, the router may prevent reordering at the destination. After the packet is assigned a unique ID, the packet may then be delivered to the splitter module 120. The packet contains a header and payload portion. The splitter module 120 splits the header from the payload and attaches the unique ID to the header and the payload. The splitter delivers the header to the packet processing load balancer 135 and the payload to the packet buffer load balancer 130.

The packet processing load balancer 135 distributes the header to one of the NPU 140 for processing. The NPU 140 selected by the packet processing load balancer 135 may be selected based on a predefined policy that maximizes throughput and minimizes latency. While two NPUs 140 may be depicted, any number of NPUs 140 may be implemented based upon system needs. The number of NPUs 140 used may be selected independent of the number of packet buffers 150 used. A larger number of NPUs 140 may be required in networks requiring complex processing of packets.

The packet buffer load balancer 130 distributes the packet payload to one of the packet buffers 150 based upon a predefined policy that maximizes the memory bandwidth/capacity utilization and minimizes the memory access latency. While two packet buffers 150 may be depicted, any number of packet buffers 150 may be implemented based upon system needs. Once a buffer is selected and the buffer location is determined, address information for the location may be stored in a lookup table. The look up table may use the unique ID assigned to the packet as a search key. The number of packet buffers 150 used may be selected independent of the number of NPUs 140 used. The number and size of the packet buffers 150 might be relatively large in a system designed to tolerate heavy network congestion.

When the NPU 140 has finished processing the header, the header is returned to the merger module 160. The merger module 160 uses the lookup table to locate payload. The merger searches the look up table using the unique ID stored in the packet header. The unique ID maps to a location in the packet buffer 150 where the payload may be retrieved. The payload may be read from the packet buffer 150 and the packet may then be reassembled by the merger module 160. The packet may then be sent out from the TM 110 to the network.

In certain embodiments, the NPU 140 may edit the packet header as necessary (e.g., changing the header length). The NPU 140 may also generate internal packets for use within the TM 110. The NPU 140 may also direct the TM 110 to not release the memory allocated to the payload in the packet buffer 150, thereby allowing reuse of the payload if necessary.

In embodiments where several NPUs 140 and several packet buffers 150 are installed, certain NPUs 140 and packet buffers 150 may be selectively powered down to conserve power and extend component life. For example, if the router determines that network congestion is relatively low, then some of the packet buffers 150 may be powered down. Likewise, if the router determines that the packets to be routed require less special processing, then certain NPUs 140 may be powered down. Because the processing at the NPU 140 and packet buffer 150 occurs in parallel, more NPUs 140 may be installed and/or powered up than packet buffers 150, or more packet buffers 150 may be installed and/or powered up than NPUs 150.

Figure 2:
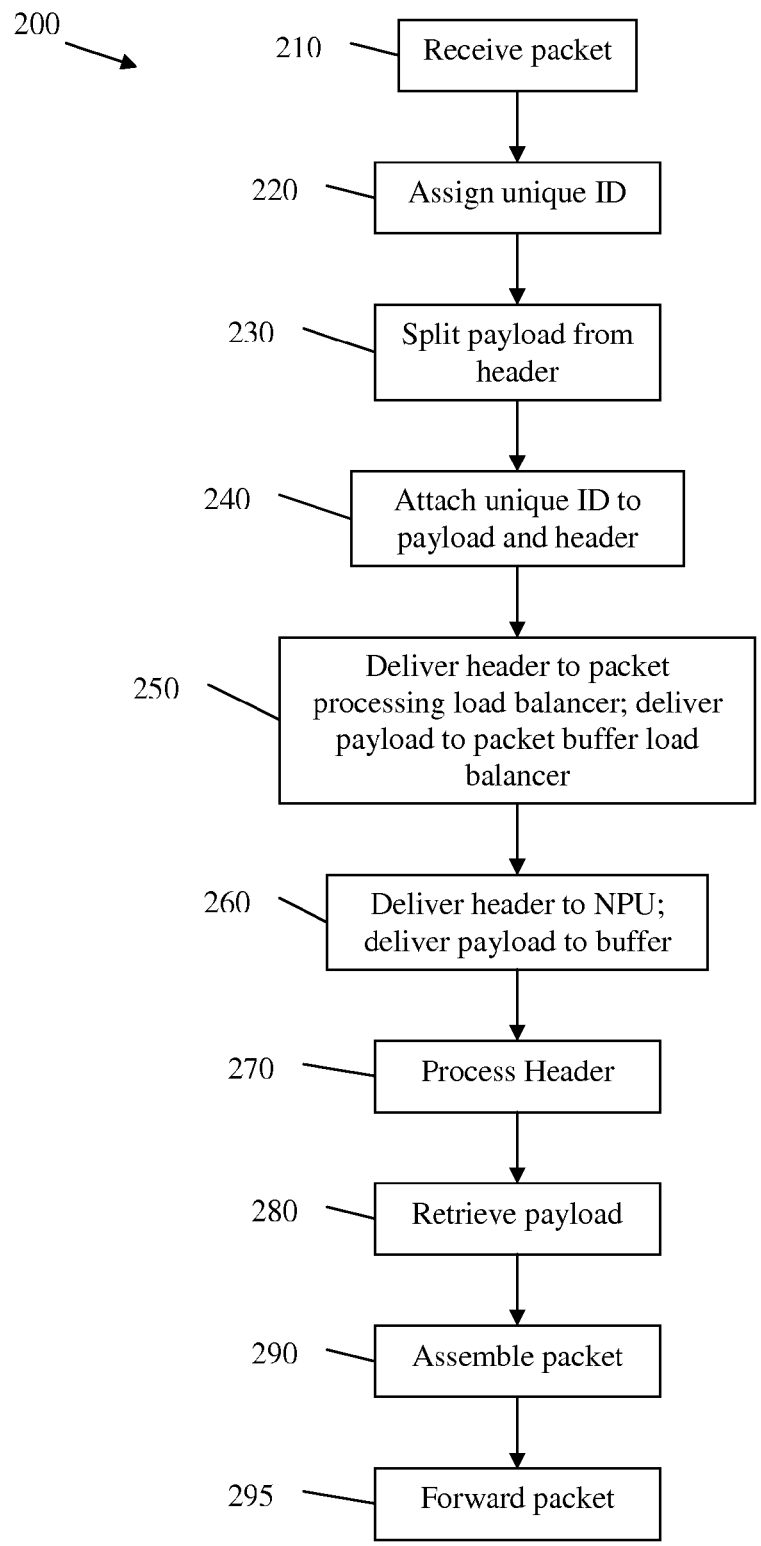
FIG. 2 is a flowchart of an embodiment of a decoupled and concurrent packet processing and packet buffering method.

FIG. 2 is a flowchart of an embodiment of a decoupled and concurrent packet processing and packet buffering method. The method begins at step 210 when a packet is received at a traffic manager (TM). The TM may then assign a unique ID to the packet at step 220. Next, the packet may be divided into a header and a payload at step 230. The unique ID may be attached to both the header and the payload at step 240.

Next, at step 250, the header may be delivered to a packet processing load balancer, and the payload may be delivered to a packet buffer load balancer. At step 260, the header is delivered to a NPU and the payload is delivered to a packet buffer. The header is processed at step 270. After the header is processed, the payload is retrieved from the packet buffer using the unique ID at step 280. When the header and payload have both been retrieved, the packet may be reassembled at step 290. The reassembled packet may then be forwarded out onto the network at step 295.

Figure 3:
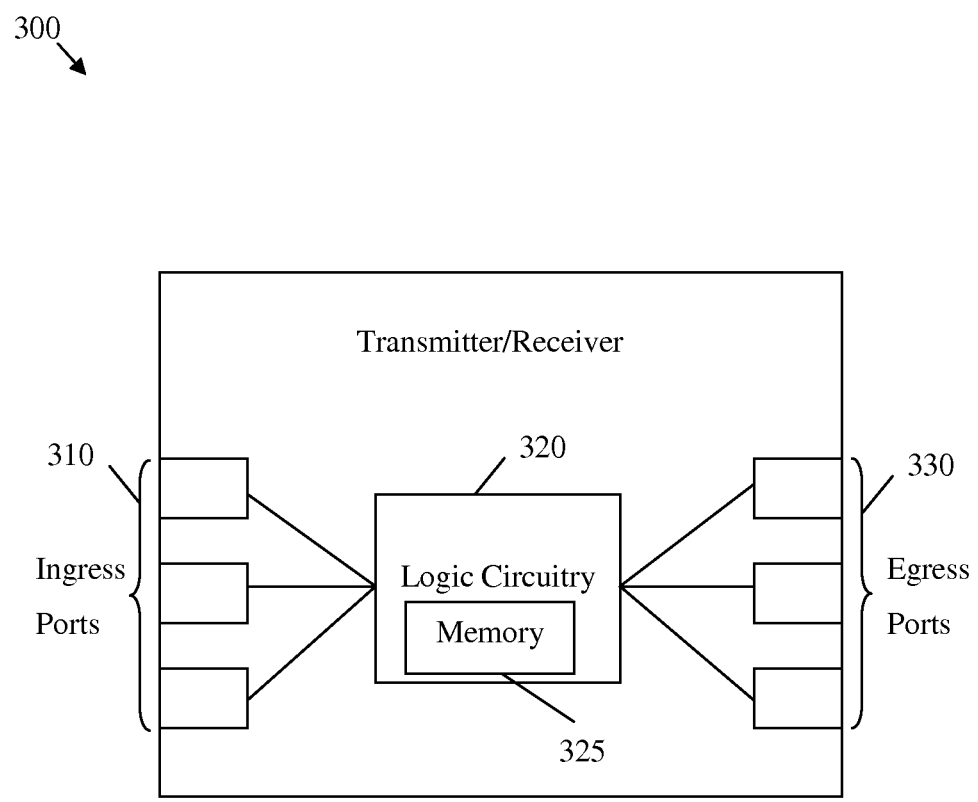
FIG. 3 is a schematic diagram of an embodiment of a transmitter/receiver unit.

FIG. 3 illustrates an embodiment of a transmitter/receiver unit 300, which may be any device that transports packets and/or contents through a network. For instance, the transmitter/receiver unit 300 may be located in the content router or any node in the content network. The transmitted/receiver unit 300 may comprise one or more ingress ports or units 310 for receiving packets, objects, or type-length-values (TLVs) from other network components, logic circuitry 320 to determine which network components to send the packets to, memory 325 that may be used as a buffer, and one or more egress ports or units 330 for transmitting packets to other network components.

Figure 4:
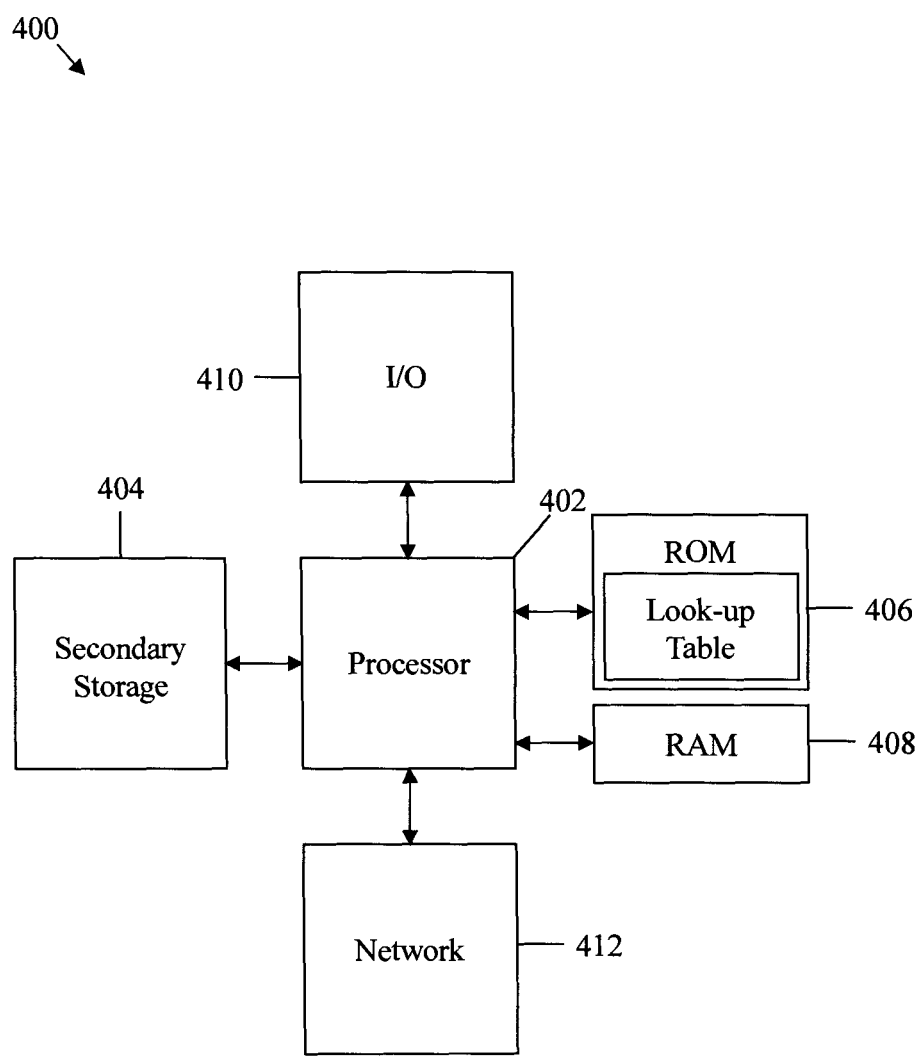
FIG. 4 is a schematic diagram of an embodiment of a general-purpose computer system.

The various embodiments described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
 a traffic manager (TM) configured to assign a unique identifier (ID) to a received packet;
 a splitter module configured to separate a header and a payload of the received packet, attach the unique ID to the header, and attach the unique ID to the payload;
 a merger module configured to receive the header from a first network processing unit (NPU) of a plurality of NPUs, obtain the unique ID attached to the header, obtain the payload from a first buffer that holds the payload, wherein the unique ID attached to the header is used to determine that the first buffer holds the payload, and merge the header and the payload according to the unique ID to form an outgoing packet;
 a packet buffer load balancer configured to receive the payload from the splitter module after attaching the unique ID to the payload, determine the first buffer amongst a plurality of packet buffers to hold the payload, and determine that the first buffer holds the payload based upon a first predefined policy for maximizing memory bandwidth and capacity utilization while minimizing memory access latency; and
 a packet processing load balancer configured to receive the header from the splitter module after attaching the unique ID to the header, determine the first NPU amongst the plurality of NPUs to process the header, and determine that the header is processed by the first NPU based upon a second predefined policy for maximizing throughput while minimizing a processing latency,
 wherein the header and the payload of the received packet are processed in parallel with each other prior to merging the header and the payload to form the outgoing packet.

2. The network component of claim 1, wherein the packet buffer load balancer is further configured to distribute the payload to the first buffer amongst the plurality of buffers, wherein the packet processing load balancer is configured to distribute the header to the first NPU amongst the plurality of NPUs.

3. The network component of claim 2 further comprising a lookup table configured to store a location of the payload following attaching the unique ID to the payload, wherein the merger module is further configured to search the lookup table using the unique ID attached to the header as a search key for the lookup table in order to retrieve the location of the payload.

4. The network component of claim 3, wherein the location of the payload is an address of the first buffer, and wherein the merger module is further configured to receive the payload from the first buffer after obtaining the address of the first buffer from the lookup table.

5. The network component of claim 4, wherein the lookup table does not release an entry after receiving the payload, and wherein the merger module is further configured to subsequently re-read the payload from the first buffer.

6. The network component of claim 2, wherein a first quantity of the plurality of NPUs is different from a second quantity of the plurality of packet buffers.

7. In a traffic manager (TM), a method for load-balancing, the method comprising:
- receiving a packet;
- assigning a unique identifier (ID) to the packet;
- splitting the packet into a header and a payload for separate processing of the header and the payload;
- attaching the unique ID to the header;
- attaching the unique ID to the payload;
- assigning the header to one of a plurality of network processing units (NPUs) for processing the header after splitting the packet, wherein the assigning the header to the one of the NPUs is determined by a first predefined policy for maximizing throughput while minimizing latency;
- assigning the payload to one of a plurality of packet buffers, wherein assigning the payload to the one of the buffers is determined by a second predefined policy for maximizing memory bandwidth and capacity utilization while minimizing memory access latency;
- receiving the header from the one of a plurality of NPUs;
- determining the unique ID attached to the header;
- retrieving the payload located within the one of a plurality of buffers, wherein the one of the buffers is identified using the unique ID attached to the header; and
- subsequently reassembling the payload and the header to form an outgoing packet using the unique ID,
- wherein the header and the payload are processed in parallel with each other prior to reassembling the header and the payload to form the outgoing packet.

8. The method of claim 7 further comprising:
- attaching the unique ID to the header prior to processing the header at the one of the NPUs; and
- attaching the unique ID to the payload prior to buffering the payload at the one of the buffers.

9. The method of claim 8 further comprising storing a location of the payload in a lookup table that references the one of the buffers following attaching the unique ID to the payload.

10. The method of claim 9 further comprising:
- processing the header by the one of the NPUs;
- retrieving the unique ID attached to the header;
- performing a lookup using the unique ID as a search key to determine the location of the payload; and
- reading the payload from the one of the buffers in response to performing the lookup.

11. The method of claim 10, wherein the location is a memory address, and wherein the method further comprises directing that the memory address not be released after reading the payload and subsequently re-reading the payload from the one of the buffers.

12. The method of claim 8, wherein a quantity of the plurality of NPUs is different than a quantity of the plurality of packet buffers, and wherein assigning the header and assigning the payload occurs in parallel.

13. The method of claim 7, further comprising selectively powering down one or more of a plurality of NPUs or selectively powering up the one or more of the plurality of NPUs based upon actual or expected network traffic complexity.

14. The method of claim 7, further comprising selectively powering down one or more of a plurality of packet buffers or selectively powering up the one or more of the plurality of packet buffers based upon actual or expected network traffic volume.

15. A computer program product for load-balancing data packets, the computer program product comprising computer executable instructions stored in a non-transitory computer readable medium such that when executed by a processor causes a network component to:
- assign a unique identifier (ID) to a received data packet;
- separate a header and a payload of the received data packet;
- attach the unique ID to both the header and the payload;
- distribute the header with the attached unique ID to one of a plurality of network processing units (NPUs) according to a predefined load balancing policy;
- distribute the payload with the attached unique ID to one of a plurality of buffers according to a second predefined load balancing policy;
- receiving the header from the one of a plurality of NPUs;
- determining the unique ID attached to the header;
- obtain the payload from the one of a plurality of buffers referenced by the unique ID attached to the header; and
- merge the header and the payload after obtaining the payload from the one of the buffers,
- wherein the header and the payload of the received data packet are processed in parallel with each other prior to assembling the header and the payload to form an outgoing packet.

16. The computer program product of claim 15, wherein the instructions, when executed by a processor, further causes a network component to:
- attach the unique ID to both the header and the payload prior to buffering the payload in the one of the buffers;
- store an address of the one of the buffers used to buffer the payload in a lookup table following attaching the unique ID to the payload;
- map the address of one of the buffers used to buffer in the lookup table to the unique ID; and
- retrieve the address of the one of the buffers used to buffer the payload from the lookup table using the unique ID of the header as a search key for the lookup table.

17. The computer program product of claim 15,
- wherein the predefined load balancing policy selects the one of the NPUs from a packet rate, and
- wherein the second predefined load balancing policy selects the one of the buffers from a bit rate.

* * * * *